United States Patent
Queck et al.

(10) Patent No.: US 9,442,576 B2
(45) Date of Patent: Sep. 13, 2016

(54) METHOD AND SYSTEM FOR COMBINING PAPER-DRIVEN AND SOFTWARE-DRIVEN DESIGN PROCESSES

(75) Inventors: Tobias Queck, Mountain View, CA (US); Denis Browne, San Mateo, CA (US)

(73) Assignee: SAP SE, Walldorf (DE)

(*) Notice: Subject to any disclaimer, the term of this patent is extended or adjusted under 35 U.S.C. 154(b) by 834 days.

(21) Appl. No.: 13/106,264

(22) Filed: May 12, 2011

(65) Prior Publication Data
US 2012/0287088 A1 Nov. 15, 2012

(51) Int. Cl.
| | |
|---|---|
| G06F 3/041 | (2006.01) |
| G06F 17/30 | (2006.01) |
| G06K 9/34 | (2006.01) |
| G06F 3/0488 | (2013.01) |
| G06F 17/22 | (2006.01) |
| G06K 9/00 | (2006.01) |
| G06F 17/24 | (2006.01) |
| G06F 3/0354 | (2013.01) |
| G06F 3/03 | (2006.01) |

(52) U.S. Cl.
CPC ......... *G06F 3/03545* (2013.01); *G06F 3/0321* (2013.01)

(58) Field of Classification Search
CPC . G06F 3/03545; G06F 3/0321; G06K 19/00; G06K 19/005; G06K 19/06
USPC ........ 178/18.03; 345/1.1, 175, 179, 473, 76; 358/1.15, 1.18; 382/123, 199, 382/187–188; 400/88; 715/205, 262, 761, 715/788; 455/41.2
See application file for complete search history.

(56) References Cited

U.S. PATENT DOCUMENTS

| | | | | |
|---|---|---|---|---|
| 8,560,952 | B2 * | 10/2013 | Collins | G06F 17/248 715/234 |
| 2002/0052900 | A1 * | 5/2002 | Freeman | G06F 3/0237 715/262 |
| 2004/0205644 | A1 * | 10/2004 | Shaughnessy | G06F 17/24 715/255 |
| 2005/0052700 | A1 * | 3/2005 | Mackenzie et al. | 358/1.18 |
| 2005/0188306 | A1 * | 8/2005 | Mackenzie | G06F 17/30011 715/268 |
| 2006/0010368 | A1 * | 1/2006 | Kashi | G06F 17/2247 715/205 |
| 2007/0106950 | A1 * | 5/2007 | Hutchinson et al. | 715/761 |
| 2007/0291120 | A1 * | 12/2007 | Campbell | G06K 9/342 348/162 |
| 2008/0186259 | A1 * | 8/2008 | Todorokihara et al. | 345/76 |
| 2009/0309854 | A1 * | 12/2009 | Hildebrandt et al. | 345/179 |
| 2010/0158326 | A1 * | 6/2010 | Takeda | 382/119 |
| 2011/0249027 | A1 * | 10/2011 | Tsuda et al. | 345/634 |

* cited by examiner

*Primary Examiner* — Lin Li
(74) *Attorney, Agent, or Firm* — Schwegman Lundberg & Woessner, P.A.

(57) ABSTRACT

A method and system for combining paper-driven and software-driven design processes is provided. An example system comprises a request detector, a stroke analyzer, and a UI definition updater. The request detector may be configured to detect a request to process a change to a UI definition. The stroke analyzer may be configured to access a stroke generated by a digital pen and determine, from the stroke, a new element to be appended to a page in the UI definition. The UI definition updater may be configured to update the UI definition, e.g., by including the new element at the target location.

20 Claims, 6 Drawing Sheets

METHOD AND SYSTEM FOR COMBINING PAPER-DRIVEN AND SOFTWARE-DRIVEN DESIGN PROCESSES

TECHNICAL FIELD

This application relates to the technical fields of software and/or hardware technology and, in one example embodiment, to system and method for combining paper-driven and software-driven design processes.

BACKGROUND

Prototyping of a user interface (UI) is a highly creative process in which it is beneficial to get ideas visualized very fast. There are software products to support these creative processes by allowing creating UI mockups and changing them. However, these tools are either very generic and flexible, which makes them harder to use or very specific, which makes them easier to use but not very flexible. As a result, it is very common to use pens, paper, scissors, sticky notes etc. to create and modify UIs.

For instance, after a UI prototype (or a mockup) is created using software-based design tools, the design may be further refined using print-outs, scissors, and glue. Thus a situation may occur where the desired UI design exists only in a paper form. It needs to be digitized and converted into the domain for which the design is being created. For example, various UI elements that are present on paper, such as buttons, fields, etc., need to be converted into UI elements suitable for the target platform. Thereafter, it is still common to change the mockup UI because then is the first time that the mockup can be visualized on its target platform. Even at this stage of the design process a redesign using pen and paper may take place, especially when significant changes to the UI design are required. Merging these processes—software-based UI design and paper-based UI design may be cumbersome and labor-intensive.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Method and system for combining paper-driven and software-driven design processes are described. In the following description, for purposes of explanation, numerous specific details are set forth in order to provide a thorough understanding of an embodiment of the present invention. It will be evident, however, to one skilled in the art that the present invention may be practiced without these specific details. As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, any type of server environment, including various system architectures, may employ various embodiments of the application-centric resources system and method described herein and is considered as being within a scope of the present invention.

As mentioned above, a person tasked with creating a UI (a designer) may start out with creating a UI design using a UI designer computing application. A UI design may include one or more pages. The UI pages created using a UI designer computing application may be combined with respective background patterns, such that a digital pen would recognize, based on the pattern, an ID of a page and the location of a UI element on the page. After a designer manipulates a paper version of the UI layout—e.g., by cutting out a button from one printed page of the UI design and pasting it onto another printed page of the UI design (onto the main page)—the designer may wish to convert this new paper layout into a digital format. Method and system are provided for converting a UI layout created by physically combining elements from different pages of the UI design into a digital format. A UI design may be represented by a so-called UI definition, which may be expressed in various formats, such as, e.g., a proprietary format provided by a particular UI designer software or a more generic format, such as a format associated with eXtensible Markup Language.

In one embodiment, example method and system utilize a digital pen capable of recognizing a unique pattern printed on paper together with a UI layout and that allows combining printed elements from different printed pages in a digital representation. When a digital UI page that has been combined with a unique background pattern (also referred to as a dot pattern) is printed out and a user taps the printed document with her digital pen, the digital pen detects the dot pattern printed on the paper document and, based on the detected dot pattern, can determine the identification of the associated digital UI page. When a unique pattern (background pattern) is combined with a UI page, a mapping is created between the portions of the unique pattern and various features and details of the UI page. A digital pen, typically, has a scanning device that can be used to scan a paper document and detect the dot pattern that provides an absolute and relative reference for a scanning device.

The method to convert a new paper layout into a digital format may be realized, in one embodiment, by recording a line continuously drawn (using a digital pen) through a new element from a different page that was pasted onto the original page, calculating connection points based on the position and the time of the drawn line. The recorded continuously drawn line, also termed a stroke, may be analyzed, by a stroke analyzer module, to determine the identification of the main page, the identification of a second page, and the identification of a new element from the second page pasted onto the main page. The UI definition may be then updated based on the determined information by adding the identification of the new element to the digital representation of the main page. A stroke analyzer module may reside on a digital pen or on any other computer system capable of receiving or accessing strokes recorded by a digital pen. In some embodiments, a translator component may be provided that connects the paper-based design method with the software-based design method by offering a bi-directional translation of the UI definition (also referred to as Design MetaInfo).

Figure 1:
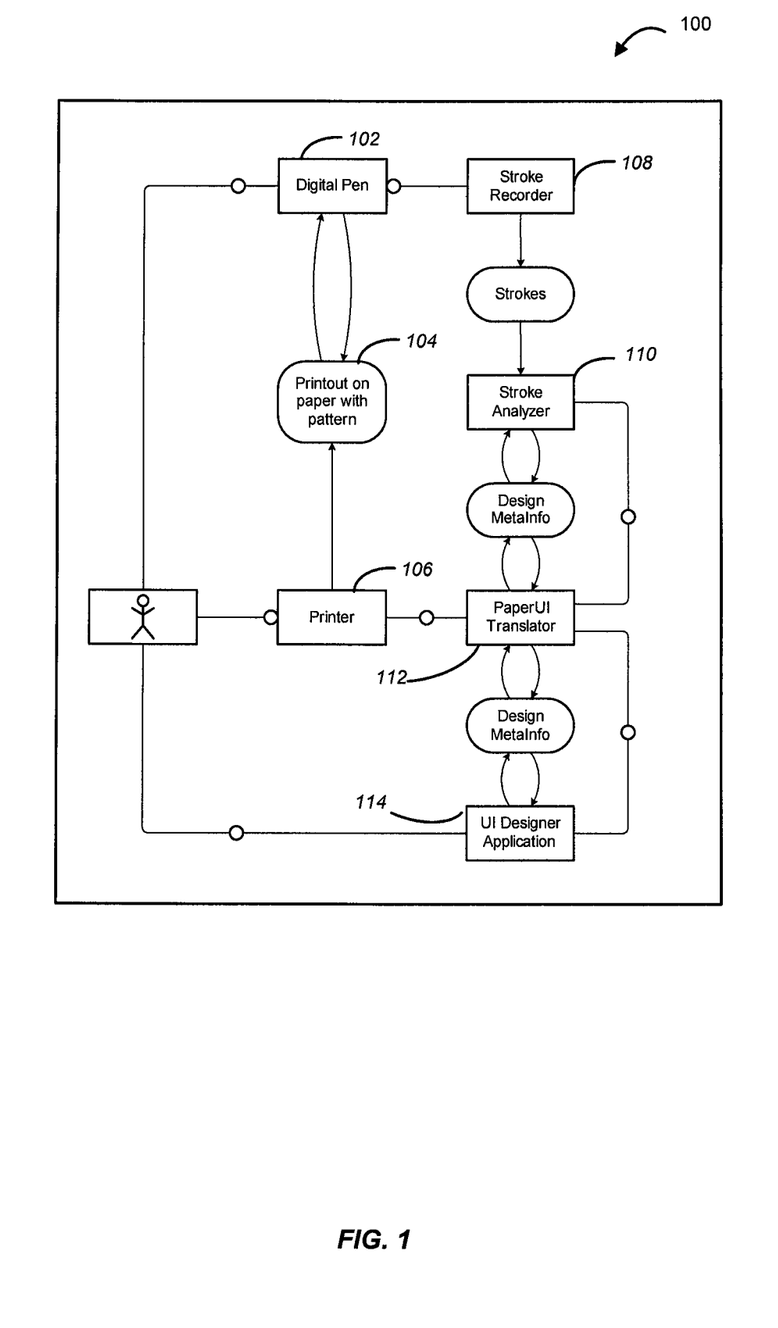
FIG. 1 is a diagrammatic representation of an example architecture within which an example method and system for combining paper-driven and software-driven design processes may be implemented.

Example architecture 100 for combining paper-driven and software-driven design processes is illustrated in FIG. 1. Shown in FIG. 1, is a Digital Pen 102, a printout 104, a printer 106, a stroke recorder 108, a stroke analyzer 110, a Translator 112, and a UI Designer Application 114. The Digital Pen 102 comprises an infrared camera and a computer that can record all strokes that are drawn on the Printout 104. The Printout 104 is a printout of a UI layout page that has been combined with a unique background pattern. As explained above, the unique background pattern is mapped to elements and features of the digital version of the UI layout page. The Printer 106 may be any printer that can print black and white with a resolution that is required for making the background pattern detectable by an infrared camera (also referred to as a scanner) provided with the Digital Pen 102.

The Stroke Recorder 108 records strokes (continuously drawn lines) detected using the infrared camera provided with the Digital Pen 102. Recorded strokes contain start and end coordinates, as well as the time stamps associated with respective strokes. The Stroke Analyzer 110 may be configured to process the strokes based on Design MetaInfo, to separate commands and new UI elements, to connect strokes from different pages, and to add/update/delete UI elements to/in/from the Design MetaInfo. The Design MetaInfo may comprise information about the UI layout, such as, e.g., size, resolution, and background pattern identification. The Design MetaInfo may also comprise the UI elements provided in the UI layout and their respective identifications, as well as the respective positions and sizes of respective UI elements on the UI layout. The Design MetaInfo may also comprise element templates that can be added to the UI layout (e.g., by assigning a unique ID to each new UI element) and the image of the UI layout in certain exact resolution. The Stroke Analyzer 110 may be executing on the Digital Pen 102 or may be executing on any computer system that, e.g., is capable of being in communication with the Digital Pen 102 via a wire or wireless network connection.

The Translator 112 (also referred to as a PaperUI Translator), may be configured to read and write Design MetaInfo in different formats and may contain sub-components to perform format conversions, e.g., from a format provided by the UI Designer Application 114 into a more generic format, such as a format associated with eXtensible Markup Language, and from a generic format into a proprietary format provided by the UI Designer Application 114. The Translator 112 also coordinates the communication between the sub-components. The UI Designer Application 114 may be any UI Designer Software that allows to import and export designed components in a meta format (Design MetaInfo).

Example process performed within the architecture 100 may include the steps shown in Table 1 below.

TABLE 1

Figure 2:
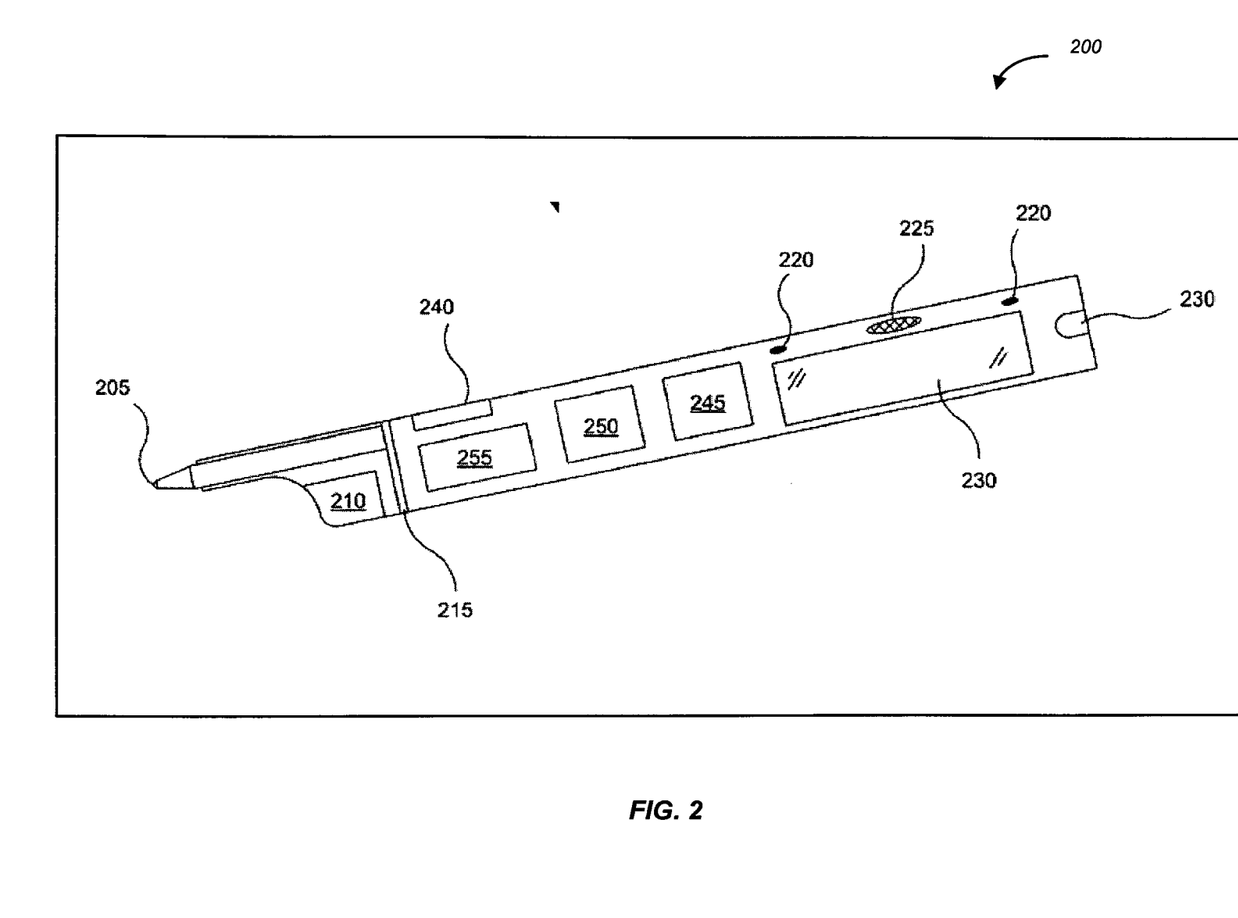
FIG. 2 is a diagrammatic representation of a digital pen within which an example method and system for combining paper-driven and software-driven design processes may be implemented.

1. UI Designer Software: Prepare design process template in a standard UI Designer Software
   Add any fixed requirements like format, e.g., specific screen size/format on a mobile device
   Define a frame to have an identification of the target platform, e.g., an icon showing a picture of the target device, and optionally add fixed elements
   Define/Select possible target elements (could be done automatically be selecting a target platform)
2. UI Designer Software: Export the Design MetaInfo
3. PaperUI Translator: Enhance Design MetaInfo and send it to a Printer
   Combine image with a background pattern
   Add the mapping information to the Design MetaInfo
   Create commands on paper - several options of implementing it
     i. Enhance the print with a menu on the side/bottom/... containing potential target elements and store and add their location information to the exported design as interactive elements
     ii. Mark all potential target elements as dynamic elements that can be assigned using specific stroke patterns, e.g., writing a circle and adding the unique ID in it
   Forward command information to Stroke Analyzer
   Create additional UI element templates on additional page that are also enhanced with a unique pattern (buttons, label, tables)
   Send enhanced design image to Printer
4. PaperUI Translator: Convert Design MetaInfo in Stroke Analyzer specific format
5. User uses the Digital Pen to design a UI on the Printout on paper with pattern
   Create a new UI element by drawing and using the menu
     i. Tap printed menu with element type then draw it
     ii. Double tap on paper
   Create a new UI element by drawing and using dynamic elements
     i. Tap starting point
     ii. Draw element
     iii. Write unique ID in element
     iv. Double tap unique ID
   Create new UI element by gluing a printed element template on top of the layout
     i. Cut the template out
     ii. Glue it on the layout
     iii. Double tap it
     iv. Add further design, e.g., text on a label/button/table
     v. Draw a continuous line from this element to the layout print
     vi. Double tap on layout
   Delete a UI element by using printed buttons or dynamic elements
     i. Tap printed delete button in menu or cross it out
     ii. Circle an existing element (printed or drawn)
     iii. Double tap it
   Delete a UI element by gluing a an empty piece of paper on top of the layout
     i. Cut the empty paper to the correct size
     ii. Glue it on the layout
     iii. Double tap it
     iv. Draw a continuous line from this piece of paper to the layout print
     v. Double tap on layout
6. Stroke Recorder records all Strokes that are recognized by an infrared camera provided with the Digital Pen, in parallel with the user doing the drawings
7. Stroke Analyzer waits for recognizable activities
   A printed menu element is tapped
     i. Wait for double tap that signals the end of this activity
     ii. Define the UI element for this activity
     iii. Convert strokes in Design MetaInfo
     iv. Example: button
        1. Find top left and bottom right corner
        2. Do text recognition on text within the corners
        3. Look for specific characteristics, e.g., rounded/sharp corners
        4. Store these characteristics in Design MetaInfo TABLE 1-continued The paper has been tapped where no printed menu item is present
    i. Wait for double tap
    ii. Recognize the UI element ID at the position of the double tap
    iii. Convert strokes associated with time stamps between tap and creation of the UI element ID in Design MetaInfo
A double tap has been recognized on a UI element template or an empty piece
    i. Wait for double tap
    ii. Analyze the last continuously drawn line
        1. Recognize respective IDs of the two pages that the line is drawn on
        2. Calculate the location of the glued element or empty piece on the paper based on the points of the line
    iii. If the glued piece of paper is a UI element
        1. Recognize text or other designs that have been added to the template
        2. Add recognized UI element to Design MetaInfo
    iv. If the glued piece of paper is empty
        1. Find UI elements that are under it
        2. Remove these elements from the Design MetaInfo
A tap on the printed delete button
    i. Wait for double tap
    ii. Analyze the circle and find elements that are in this area
    iii. Remove these elements from the Design MetaInfo
An element has been crossed out
    i. Wait for double tap
    ii. Analyze the circle and find elements that are in this area
    iii. Remove these elements from the Design MetaInfo
8. Stroke Analyzer signals the PaperUI Translator that the Design MetaInfo has been updated
9. PaperUI Translator converts Design MetaInfo back into the format that the UI Designer Software understands
10. UI Designer Software: Enhance UI Design if necessary
11. Repeat the steps 2 to 10 as often as needed FIG. 2 is a diagram of a digital pen 200. The digital pen 200 (sometimes also referred to as a smart pen) is designed to work with this dot enabled paper and includes an imaging system and a processor that can determine the position of the digital pen's writing tip with respect to the dot pattern. In various embodiments, the digital pen 200 can communicate with a general purpose computing system, such as a personal computer or a mobile computer system. For example, content captured by the digital pen 200 may be transferred to the computing system for further use by that system. Conversely, content may also be transferred back onto the digital pen 200 from the computing system. In addition to data, the content provided by the computing system 220 to the digital pen 200 may include software applications that can be executed by the digital pen 200. The digital pen 200 may communicate with the computing system via any of a number of known communication mechanisms, including both wired and wireless communications. As shown in FIG. 2, the digital pen 200 comprises a marker 205, an imaging system 210, a pen down sensor 215, one or more microphones 220, a speaker 225, an audio jack 230, a display 235, an I/O port 240, a processor 245, an onboard memory 250, and a battery 255. It should be understood, however, that not all of the above components are required for the digital pen 200, and this is not an exhaustive list of components for all embodiments of the digital pen 200 or of all possible variations of the above components. For example, the digital pen 200 may also include buttons, such as a power button or an audio recording button, and/or status indicator lights. Moreover, as used herein in the specification and in the claims, the term "digital pen" does not imply that the pen device has any particular feature or functionality described herein for a particular embodiment, other than those features expressly recited. A digital pen may have any combination of fewer than all of the capabilities and subsystems described herein.

The marker 205 enables the digital pen to be used as a traditional writing apparatus for writing on any suitable surface. The marker 205 may thus comprise any suitable marking mechanism, including any ink-based or graphite-based marking devices or any other devices that can be used for writing. In one embodiment, the marker 205 comprises a replaceable ballpoint pen element. The marker 205 is coupled to a pen down sensor 215, such as a pressure sensitive element. The pen down sensor 215 thus produces an output when the marker 205 is pressed against a surface, thereby indicating when the digital pen 200 is being used to write on a surface.

The imaging system 210 comprises sufficient optics and sensors for imaging an area of a surface near the marker 205. The imaging system 210 may be used to capture handwriting and gestures made with the digital pen 200. For example, the imaging system 210 may include an infrared light source that illuminates a writing surface in the general vicinity of the marker 205, where the writing surface includes an encoded pattern. By processing the image of the encoded pattern, the digital pen 200 can determine where the marker 205 is in relation to the writing surface. An imaging array of the imaging system 210 then images the surface near the marker 205 and captures a portion of a coded pattern in its field of view. Thus, the imaging system 210 allows the digital pen 200 to receive data using at least one input modality, such as receiving written input. The imaging system 210 incorporating optics and electronics for viewing a portion of the writing surface is just one type of gesture capture system that can be incorporated in the digital pen 200 for electronically capturing any writing gestures made using the pen, and other embodiments of the digital pen 200 may use any other appropriate means for achieve the same function.

A processor 245, onboard memory 250, and battery 255 (or any other suitable power source) enable computing functionalities to be performed at least in part on the digital pen 200. The processor 245 is coupled to the input and output devices and other components described above, thereby enabling applications running on the digital pen 200, such as, e.g., the Stroke Recorder 108 of FIG. 1, to use those components. In one embodiment, the processor 245 comprises any suitable processor, and the onboard memory 250 comprises a small amount of random access memory (RAM) and a larger amount of flash or other persistent memory. As a result, executable applications can be stored and executed on the digital pen 200. In an embodiment, the processor 245 and onboard memory 250 include one or more executable applications, such as a system for combining paper-driven and software-driven design processes (e.g., the Stroke Recorder 108). An example method and system for combining paper-driven and software-driven design processes that uses capabilities of the digital pen 200 may be implemented may be implemented in the context of a network environment illustrated in FIG. 3.

Figure 3:
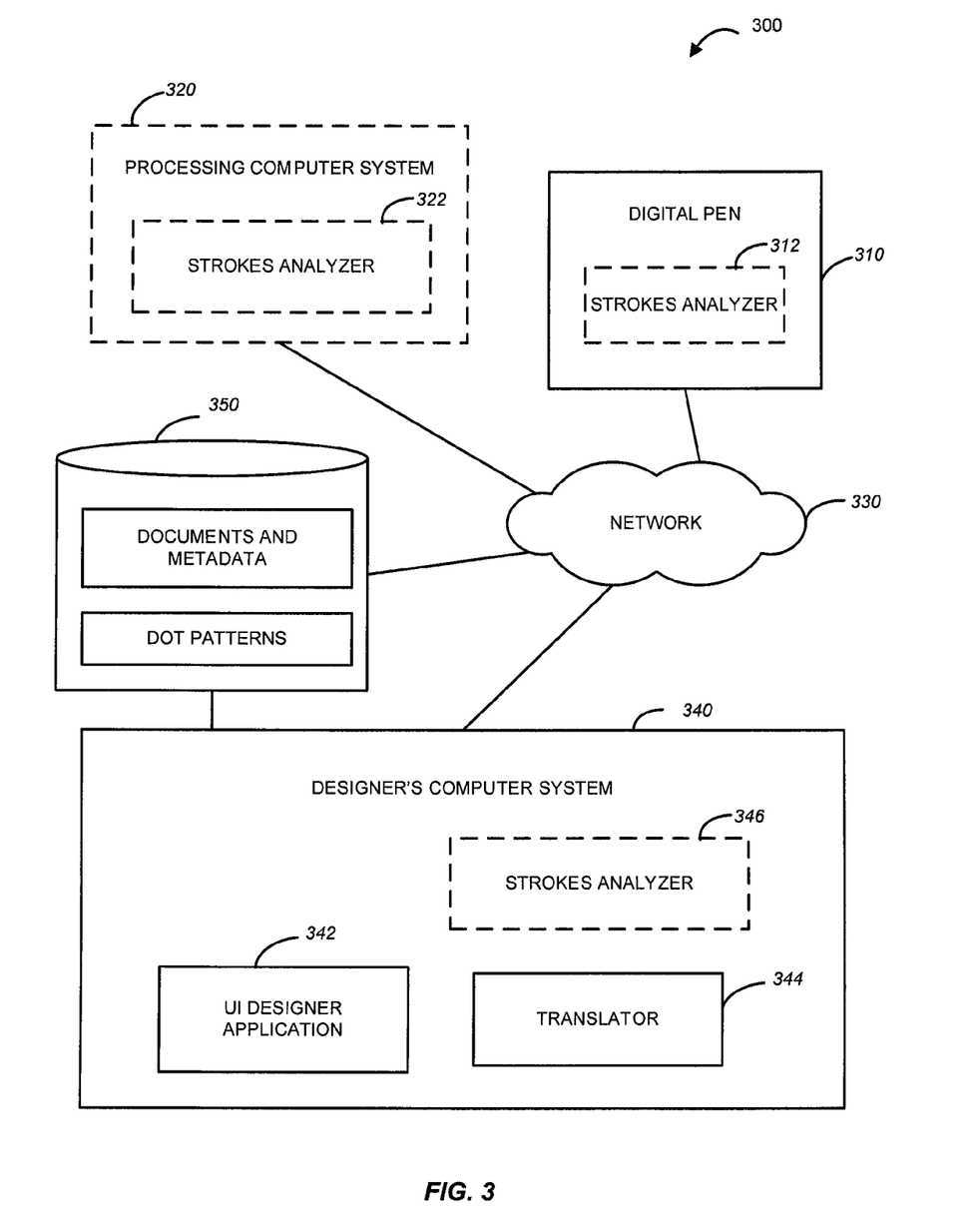
FIG. 3 is a diagrammatic representation of a network environment within which an example method and system for combining paper-driven and software-driven design processes may be implemented.

As shown in FIG. 3, the network environment 300 may include a digital pen 310 and a designer computer system 340. The designer computer system 340 may be a server computer system a client computer system, or a mobile computing device. The digital pen 310, in one embodiment, corresponds to the digital pen illustrated in FIG. 2. The designer computer system 340, in one example embodiment, may be executing a UI designer application 342 and may be in communication with the digital pen 310 via a communications network 330. The communications network 330 may be a public network (e.g., the Internet, a wireless network, etc.), a private network (e.g., a local area network (LAN), a wide area network (WAN), Intranet, etc.), or a local connection such as a connection via a universal serial bus (USB).

The designer computer system 340 is shown in FIG. 3 as comprising a UI designer application 342. The UI designer application 342 may be used to generate UI layouts and may also provide information defining the UI layouts to other modules. In one embodiment, the UI designer application 342 cooperates with a translator 346, where the translator 346 provides information associated with a UI layout in a proprietary format to the translator 346, and the translator 346 converts the received information into a UI definition in the XML format and combines pages of the UI layout with respective unique dot patterns. It will be noted that the translator 346 may be configured to convert a UI definition provided in a UI designer application-specific format into various formats that may be considered as generic formats, such as, e.g., XML, as well as use JSON (JavaScript Object Notation), CSV (comma separated values format), etc.

The digital pen 310 may be executing a stroke analyzer 312 configured to examine strokes to determine whether a new element from a different page was added to the subject UI layout associated with a UI definition, as explained above. A stroke analyzer may reside on a digital pen, but may also reside on any computer system capable of accessing strokes generated by the digital pen 310, such as on the designer computer system 340 (stroke analyzer 346) or on a processing computer system 320 (stroke analyzer 322). Various stroke analyzer modules are shown in FIG. 3 using a broken line to indicate that a stroke analyzer may reside on any one or more of the computer systems shown in FIG. 3. A computer system executing a stroke analyzer may be referred to as a stroke analyzer computer system.

As shown in FIG. 3, the designer computer system 340 is connected to a database 350 that may store electronic documents (e.g., representing UI layouts), as well as dot patterns and mapping information. As explained above, an identification of an electronic document may be mapped to a unique dot pattern, so that the document validation application may be configured to access validity information of an electronic document (stored as metadata) based on the identified dot pattern of a printed document. An example system for combining paper-driven and software-driven design processes may be described with reference to FIG. 4.

Figure 4:
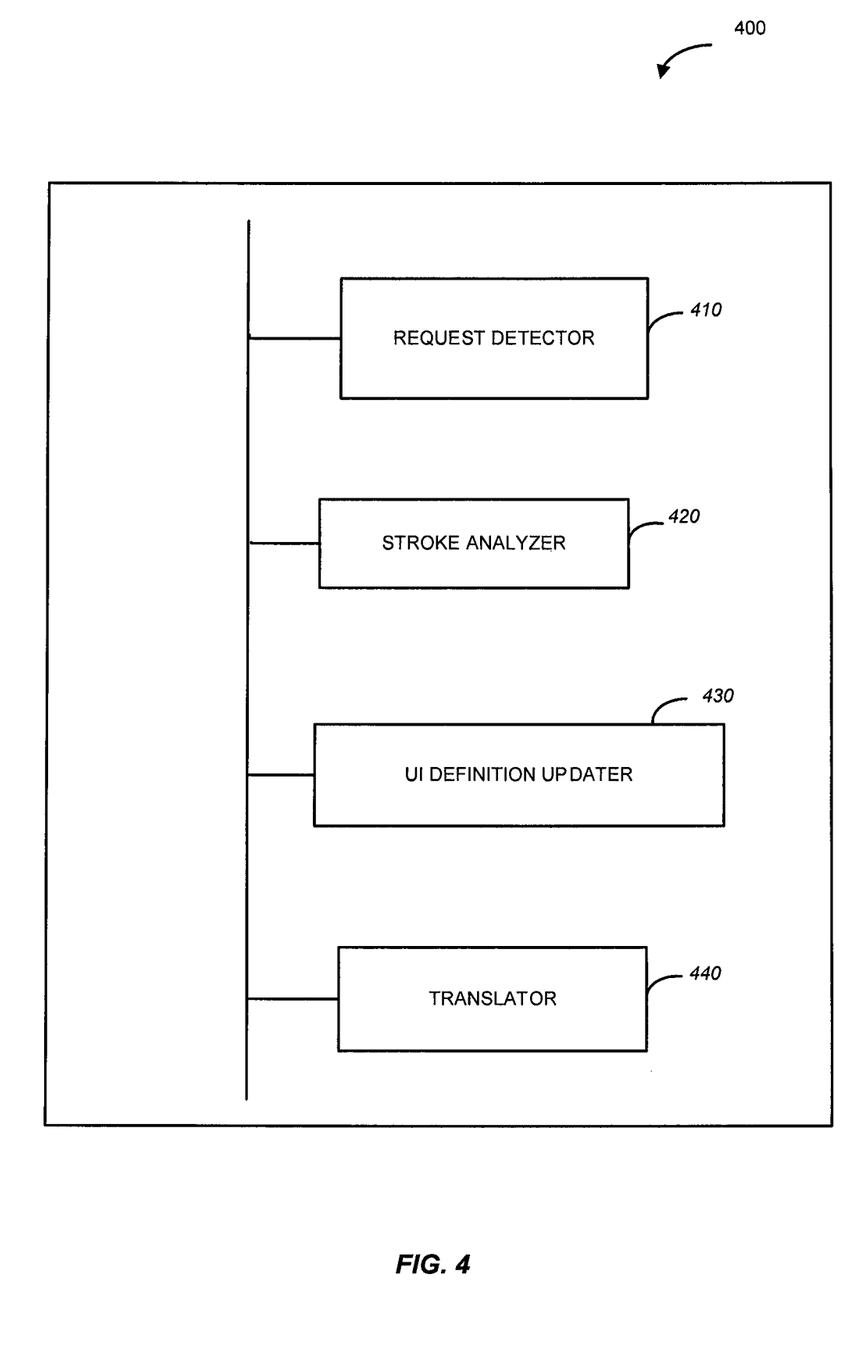
FIG. 4 is block diagram of a system for combining paper-driven and software-driven design processes, in accordance with one example embodiment.

FIG. 4 is a block diagram of a system 400 for combining paper-driven and software-driven design processes, in accordance with one example embodiment. As shown in FIG. 4, the system 400 includes a request detector 410, a stroke analyzer 420, and a UI definition updater 430. The request detector 410 may be configured to detect, using at least one processor, a request to process a change to a UI definition. A UI definition may comprise a representation one or more digital pages of a UI layout. The stroke analyzer 420 may be configured to access a stroke generated by a digital pen (e.g., the digital pen 310 of FIG. 3). A stroke is associated with a line continuously drawn by the digital pen on a printed document, where the printed document comprises a first background pattern (dot pattern) that is mapped to a particular page of the UI layout. The stroke analyzer 420 may also be configured to determine, from the stroke, a new element to be appended to the page and a target location of the new element on the page.

In one embodiment, the stroke analyzer 420 determines that the stroke represents a line drawn on a printed document through areas associated with two background patterns, which indicates that elements of two different digital pages from a UI layout have been combined in a printed form, e.g., an element from a second page having been pasted onto the main page. Because each digital page from the UI layout is mapped to a different unique background pattern, the stroke analyzer 420 is capable of determining the respective identifications of the two corresponding digital pages, the identification of an element from a second page that was pasted onto the main page, as well as the location of the pasted element on the main page. The stroke analyzer 420 may determine that the new element, which may be a UI element or merely a blank space, was pasted over another element (an old element) on the main page. The stroke analyzer 420 may then provide information to the UI definition updater 430 that would cause the UI definition updater to remove the old element from the digital representation of the main page in the UI definition. The UI definition updater 430 may be configured to update the UI definition, e.g., by including the new element determined using the stroke analyzer 420 in the page at the target location.

The system 400, in one embodiment, also includes a translator 440. As explained above, the translator 440 may be configured to access information defining a UI layout and convert it from one format into another format. For example, translator 440 may be configured to convert a UI definition in a format provided by a UI designer application into an XML format and vice versa. Various modules illustrated in FIG. 4 may be implemented as software, hardware, or a combination of software and hardware, utilizing at least one processor. An example method for combining paper-driven and software-driven design processes can be described with reference to FIG. 5.

Figure 5:
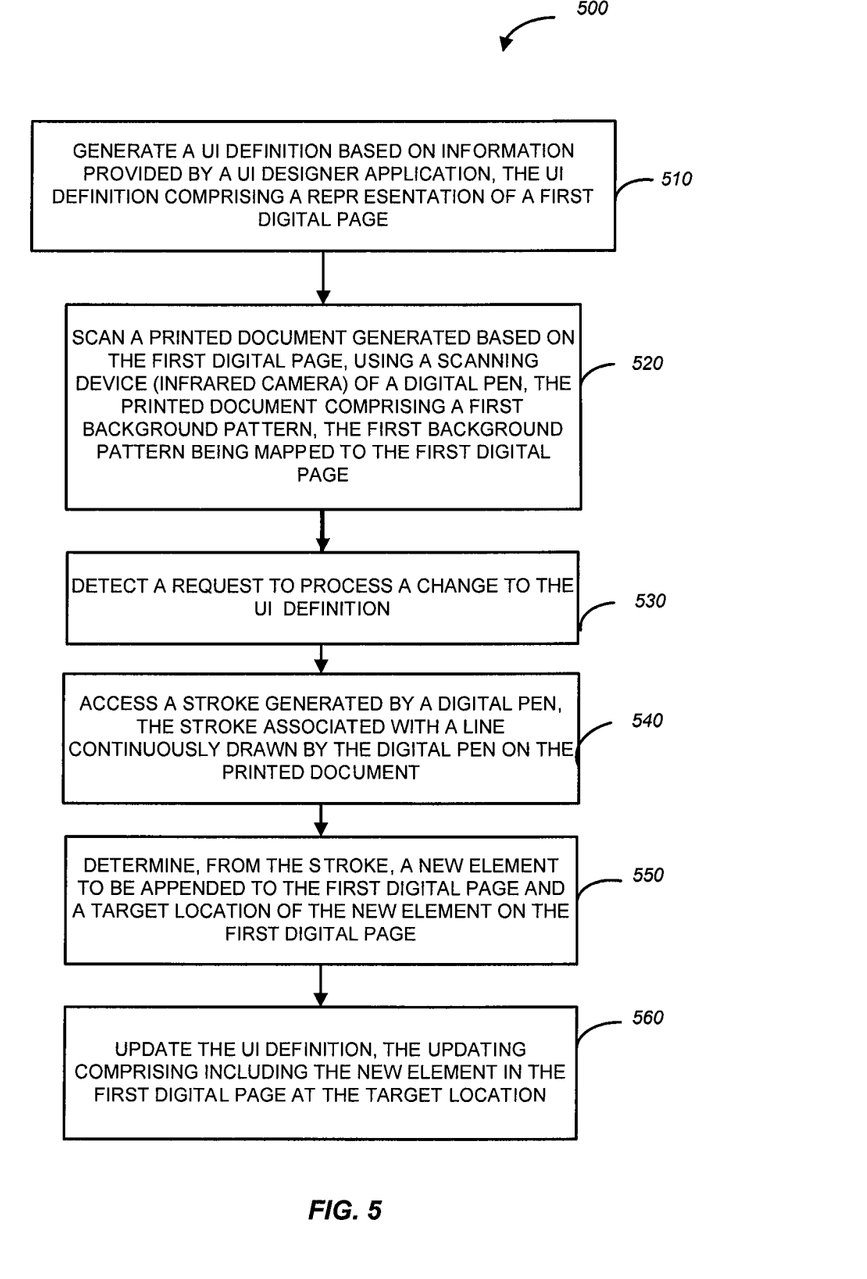
FIG. 5 is a flow chart of a method for combining paper-driven and software-driven design processes, in accordance with an example embodiment.

FIG. 5 is a flow chart of a method 500 for combining paper-driven and software-driven design processes, according to one example embodiment. The method 500 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the system 400 shown in FIG. 4.

As shown in FIG. 5, the method 500 commences at operation 510, when the translator 440 of FIG. 4 generated a UI definition based on information provided by the UI designer application 342 of FIG. 3. At operation 520, an infrared camera of the digital pen 310 of FIG. 3 scans a printed document that includes a background pattern that has been mapped by the translator 440 to a first digital page in the UI definition. At operation 530, the request detector 410 of FIG. 4 detects, using at least one processor, a request to process a change to the UI definition.

At operation 540 a stroke analyzer 420 accesses a stroke generated by the digital pen 310. The stroke is associated with a line continuously drawn by the digital pen 310 on the printed document that includes a background pattern. The stroke analyzer 420 determines, at operation 550, a new element to be appended to the first digital page and a target location of the new element on the first digital page. At operation 560, the UI definition updater 430 of FIG. 4 updates the UI definition by including the new element in the first digital page at the target location.

Figure 6:
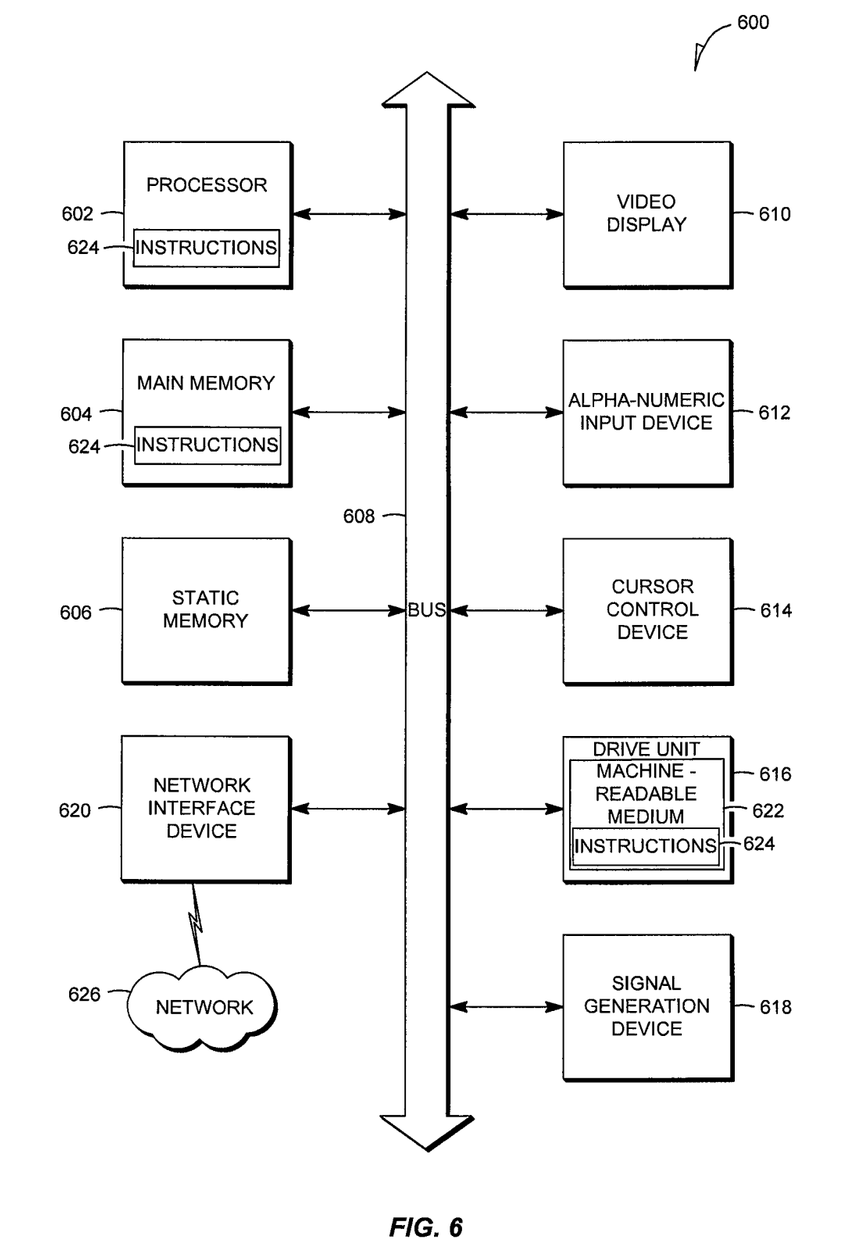
FIG. 6 is a diagrammatic representation of an example machine in the form of a computer system within which a set of instructions, for causing the machine to perform any one or more of the methodologies discussed herein, may be executed.

FIG. 6 shows a diagrammatic representation of a machine in the example form of a computer system 600 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 606. The computer system 600 may further include a video display unit 610 (e.g., a liquid crystal display (LCD) or a cathode ray tube (CRT)). The computer system 600 also includes an alpha-numeric input device 612 (e.g., a keyboard), a user interface (UI) navigation device 614 (e.g., a cursor control device), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, with the main memory 604 and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, a method and system for combining paper-driven and software-driven design processes has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:
    detecting, using at least one processor, a request to process a change to a user interface (UI) definition, the UI definition representing a UI design and comprising:
        one or more UI elements and their respective identifications,
        respective positions and sizes of the one or more UI elements on a UI layout, and
        an element template that can be added to the UI layout as a new UI element;
    accessing a stroke generated by a digital pen, the stroke representing a line continuously drawn by the digital pen on a paper document, the paper document representing the UI layout, the paper document comprising a first background pattern, the first background pattern being mapped to a first digital page, the first digital page being a digital version of the UI layout;
    determining that the line represented by the stroke is drawn on the paper document through areas associated with two respective background patterns, which indicates that elements of two different digital pages have been combined in a printed form, a first area from areas associated with two respective background patterns having the first background pattern and a second area from areas associated with two respective background patterns having second background pattern, the second background pattern being mapped to a second digital page, the second area corresponding to the element template from the UI definition;
    from the stroke, determining:
        identification of the first digital page based on the first background pattern,
        identification of the second digital page based on the second background pattern, and
        a target location of the new UI element on the first digital page; and
    updating the UI definition, the updating comprising including the new UI element to the UI definition and in the first digital page at the target location.

2. The method of claim 1, comprising:
    based on the first background pattern, determining an old UI element at the target location on the first digital page;
    identifying a second background pattern associated with the stroke; and
    determining an identification of the new UI element based on the second background pattern, the new UI element being a UI element.

3. The method of claim 2, wherein the updating of the UI definition comprises removing the old UI element from the first digital page.

4. The method of claim 1, comprising:
    determining that the new UI element is a blank; and
    determining an old UI element at the target location on the first digital page, wherein the updating of the UI definition comprises removing the old UI element from the first digital page.

5. The method of claim 1, wherein the determining of the new UI element and the target location of the new UI element on the first digital page is performed by a stroke analyzer module, the stroke analyzer module executing at the digital pen.

6. The method of claim 1, wherein the determining of the new UI element and the target location of the new UI element on the first digital page is performed by a stroke analyzer module, the stroke analyzer module executing at a stroke analyzer computer system that is distinct from the digital pen.

7. The method of claim 1, comprising generating the UI definition based on information provided by a UI designer application.

8. The method of claim 7, wherein the generating of the UI definition comprises converting the information provided by the UI designer application into a generic format.

9. The method of claim 8, wherein the generic format is XML format.

10. The method of claim 1, wherein the generating of the UI definition comprises:
    mapping the first digital page to the first background pattern; and
    mapping a second digital page to the second background pattern.

11. A computer-implemented system comprising:
    a request detector to detect, using at least one processor, a request to process a change to a user interface (UI) definition, the UI definition representing a UI design and comprising:
        one or more UI elements and their respective identifications,
        respective positions and sizes of the one or more UI elements on a UI layout, and
        an element template that can be added to the UI layout as a new UI element;
    a stroke analyzer configured to:
        access a stroke generated by a digital pen, the stroke representing a line continuously drawn by the digital pen on a paper document, the paper document representing the UI layout, the paper document comprising a first background pattern, the first background pattern being mapped to a first digital page, the first digital page being a digital version of the UI layout,
        determine that the line represented by the stroke is drawn on the paper document through areas associated with two respective background patterns, which indicates that elements of two different digital pages have been combined in a printed form, a first area from areas associated with two respective background patterns having the first background pattern and a second area from areas associated with two respective background patterns having a second background pattern, the second background pattern being mapped to a second digital page, the second area corresponding to the element template from the UI definition, and
        determine, from the stroke, identification of the first digital page based on the first background pattern, and a target location of the new UI element on the first digital page; and
    a UI definition updater to update the UI definition, the updating comprising including the new UI element to the UI definition and in the first digital page at the target location.

12. The system of claim 11, wherein the stroke analyzer is to:
    based on the first background pattern, determine an old UI element at the target location on the first digital page; and
    identify a second background pattern associated with the stroke; and
    determine an identification of the new UI element based on the second background pattern, the new UI element being a UI element.

13. The system of claim 12, wherein the UI definition updater is to remove the old UI element from the first digital page.

14. The system of claim 11, wherein the stroke analyzer is to:
    determine that the new UI element is a blank; and
    determine an old UI element at the target location on the first digital page, wherein the updating of the UI definition comprises removing the old UI element from the first digital page.

15. The system of claim 11, wherein the stroke analyzer is executing at the digital pen.

16. The system of claim 11, wherein stroke analyzer is executing at a stroke analyzer computer system that is distinct from the digital pen.

17. The system of claim 1, comprising a translator to generate the UI definition based on information provided by a UI designer application.

18. The system of claim 17, wherein the translator is to convert the information provided by the UI designer application into a generic format.

19. The system of claim 18, wherein the generic format is XML format.

20. A machine-readable non-transitory medium having instruction data to cause a machine to perform operations comprising:
    detecting a request to process a change to a user interface (UI) definition, the UI definition representing a UI design and comprising:
    one or more UI elements and their respective identifications, respective positions and sizes of the one or more UI elements on a UI layout, and an element template that can be added to the UI layout as a new UI element;
    accessing a stroke generated by a digital pen, the stroke representing a line continuously drawn by the digital pen on a paper document, the paper document representing the UI layout, the paper document comprising a first background pattern, the first background pattern being mapped to a first digital page, the first digital page being a digital version of the UI layout;
    determining that the line represented by the stroke is drawn on the paper document through areas associated with two respective background patterns, which indicates that elements of two different digital pages have been combined in a printed form, a first area from areas associated with two respective background patterns having the first background pattern and a second area from areas associated with two respective background patterns having a second background pattern, the second background pattern being mapped to a second digital page, the second area corresponding to the element template from the UI definition;

determining, from the stroke, identification of the first digital page based on the first background pattern, identification of the second digital page based on the second background pattern, and a target location of the new UI element on the first digital page; and updating the UI definition, the updating comprising including the new UI element to the UI definition and in the first digital page at the target location.

\* \* \* \* \*